Figure 4:
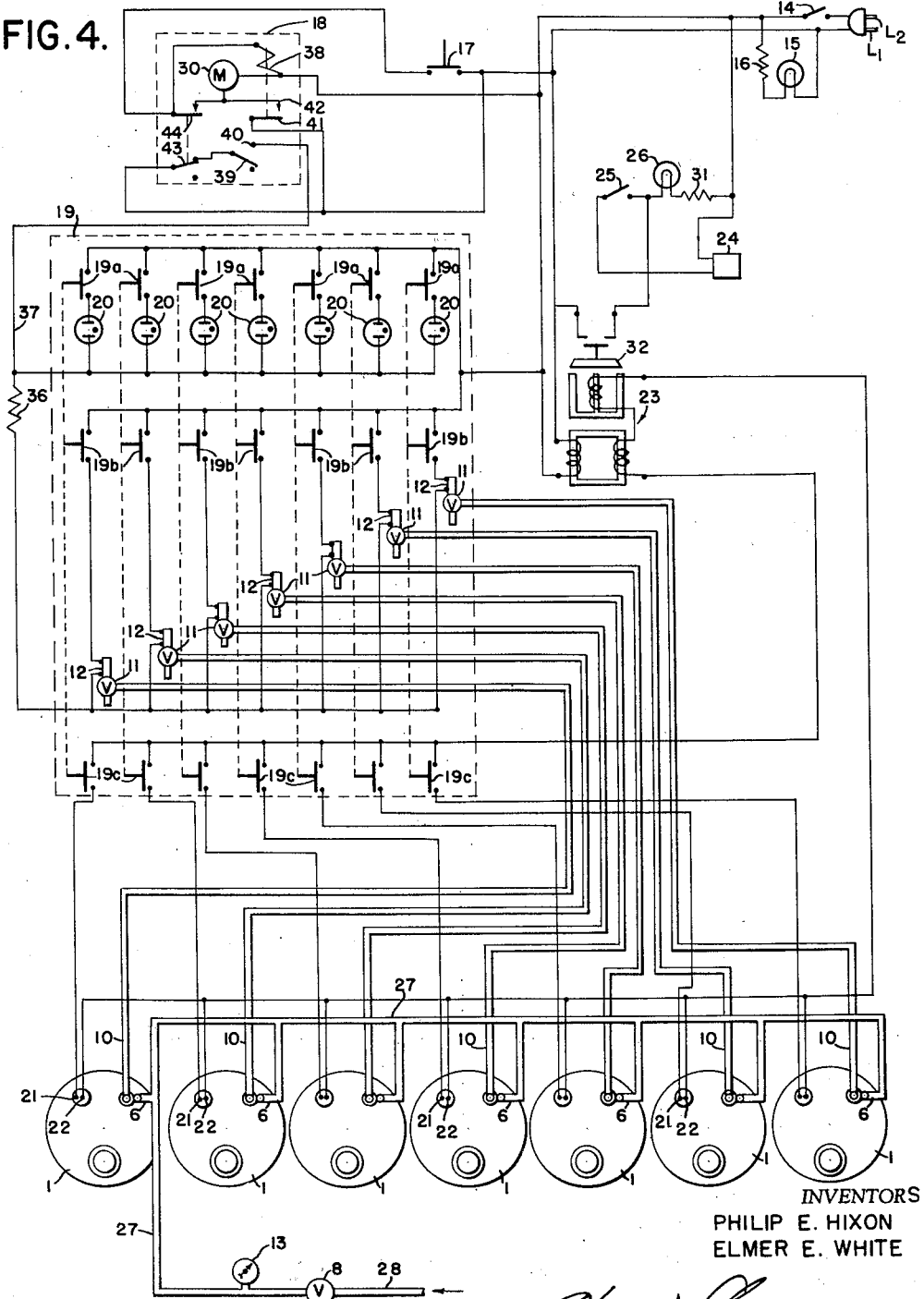

Dec. 18, 1962 P. E. HIXON ETAL 3,068,886
AUTOMATIC REPLENISHING SYSTEM
Filed June 10, 1959 2 Sheets-Sheet 1
FIG. 2.
FIG. 3.
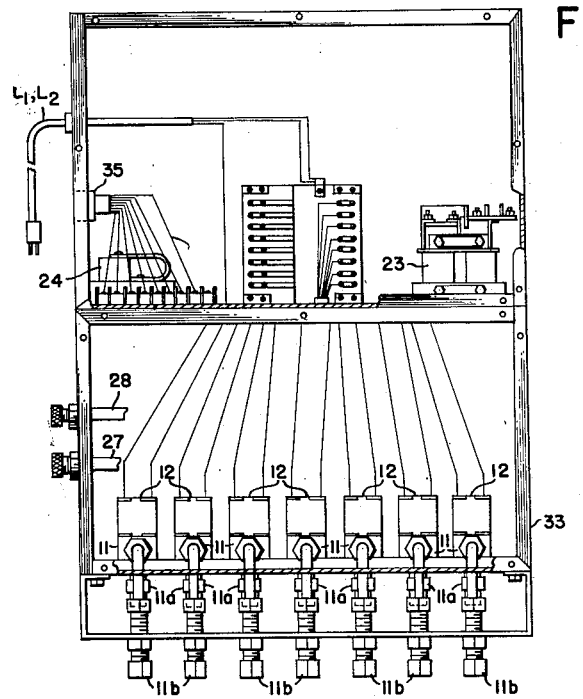
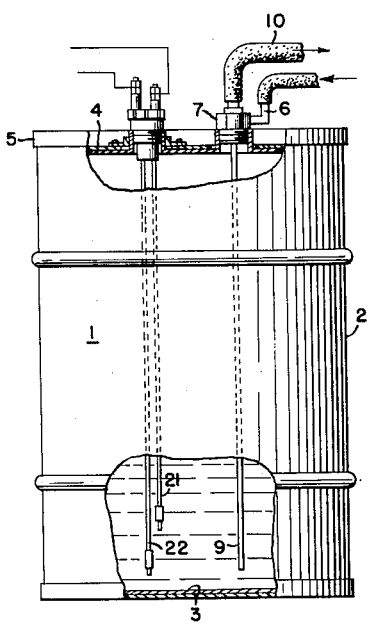
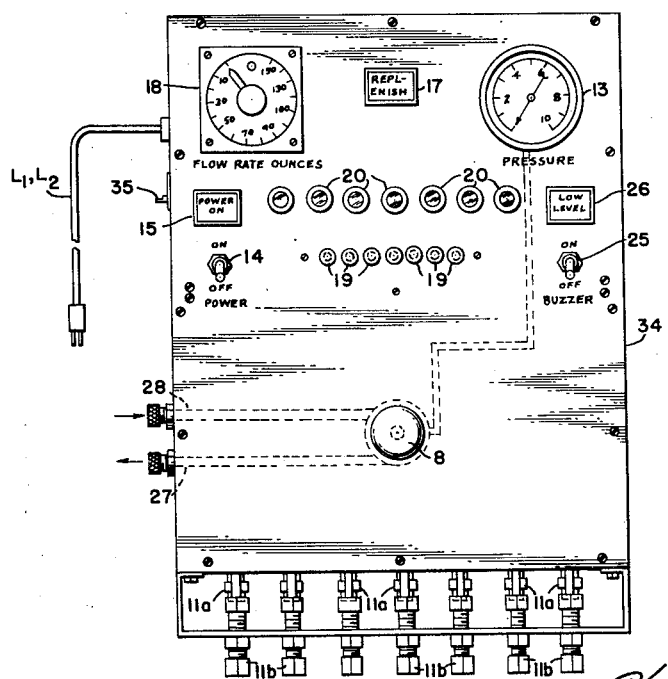
FIG. 1.
INVENTORS
PHILIP E. HIXON
ELMER E. WHITE
BY
ATTORNEY Dec. 18, 1962  P. E. HIXON ETAL  3,068,886
AUTOMATIC REPLENISHING SYSTEM
Filed June 10, 1959  2 Sheets-Sheet 2

INVENTORS
PHILIP E. HIXON
ELMER E. WHITE

BY
ATTORNEY

United States Patent Office 3,068,886
Patented Dec. 18, 1962

3,068,886
AUTOMATIC REPLENISHING SYSTEM
Philip E. Hixon, 156 Willowood Drive, Wantagh, N.Y., and Elmer E. White, 905 Orlando Ave., West Hempstead, N.Y.
Filed June 10, 1959, Ser. No. 819,466
5 Claims. (Cl. 137—266)

This invention relates to an automatic replenishing system for use in chemical processes in which reagents in any one or a plurality of reaction tanks become exhausted through use and must be replenished. More particularly it relates to a replenishing system adapted for use in color film and paper processing lines in which the treating solutions must be constantly replaced to insure uniform quality of finished product.

The processing of color film and paper involves a series of treatments of the exposed film or paper by means of different chemical solutions. In most color processes, the need to add substantial amounts of replenishment to every solution after full processing runs has presented a costly and tedious problem. This frequent and demandingly accurate chore is generally carried out by a "dip-out, measure-off, pour-in" technique which is time-consuming.

One object of this invention is to provide an automatic replenishing system which completely eliminates the old "dip-out-measure-off-pour-in" procedure.

Another object is to provide a system which will automatically cause the transfer of the required treating solution from a storage tank to the processing equipment.

A further object is to provide a system which is adaptable to automatically replenish any selected one of a plurality of treating solutions.

Still a further object is to provide a system in which control of the replenishing operation can take place from a point remote from the processing location.

Still a further object is to provide such a system which will warn the operator when the level of replenishing solution in any storage tank is too low and needs replacement.

In general, the system comprises a plurality of storage tanks each connected to a source of an inert gas under super-atmospheric pressure. Each tank is also connected through a solenoid-operated flow control valve to a particular processing tank. A master replenishing switch is connected to and is activated by an electric timer which controls the duration of liquid flow, while a ganged multiple push-button selecting switch, in series with the replenishing switch, provides the operator with the means of selecting any desired solution. Any number of contacts may be provided on the push-button selecting switch to correspond to the number of storage and processing tanks. The selecting switch is actually a combination of three ganged switches so that pushing a single selecting button simultaneously activates the proper solenoid-operated valve, turns on an indicating light to show which button was pushed and also connects a liquid level control for the storage tank. The latter will be described in greater detail below.

In the accompanying drawings:
FIGURE 1 shows a front elevation of a preferred form of an assembled control unit;
FIGURE 2 is also a front elevation of the control unit assembly with the front panel removed to show the solenoid-operated liquid flow valves;
FIGURE 3 shows one of the assembled storage tanks, partly in section, with the means for sensing the level of liquid contained therein and the means for transferring liquid; and,
FIGURE 4 is a schematic diagram of the completely assembled system showing the electrical circuits and the liquid and pressurized gas lines.

Similar reference characters indicate similar parts throughout the several views of the drawings.

As shown in the drawings, the system in a preferred form comprises a bank of seven storage tanks 1, each of which consists of a steel pressure-resistant shell 2 having a polyethylene liner 3, a lid 4, and a closing ring 5. Gas inlet tube 6 is mounted on fitting 7 which is screwed into the storage tank lid and is connected by means of tube 27 to one side of pressure control valve 8. The other side of valve 8 is connected by means of gas line 28 to a source of nitrogen (not shown) under a pressure of about 30 p.s.i. A liquid eduction tube 9, extending substantially to the bottom of the storage tank, is also mounted on fitting 7. It will thus be apparent that the gas pressure, applied to the surface of the liquid, will cause it to flow from the storage tank through eduction tube 9.

Eduction tube 9 is connected by means of a chemically inert tube 10 to the inlet end 11a of solenoid-operated valve 11, the outlet end of which, 11b, connected to the processing tank (not shown) where the particular chemical solution from a storage tank is being used. This solenoid-operated valve is normally closed, thus preventing flow of liquid until the solenoid 12 is activated.

It will be understood that each of the seven storage tanks is similarly connected by means of a common gas line 27 to the source of nitrogen and by a separate tube to its own solenoid-operated valve.

A pressure gauge 13, connected to the common gas line 27 indicates the pressure of nitrogen on the liquid surface of each tank.

Power for the system is supplied from a 110 volt main through conductors $L_1$ and $L_2$. A power switch 14 turns the system on and off, while a lamp 15, in series with resistor 16 across $L_1$ and $L_2$ serves to indicate when the power is off or on.

Current to operate the solenoid valves is turned on by timer 18. Replenishing switch 17, which is connected to the source of power, operates the timer which also controls timing motor 30. Duration of liquid flow and, therefore, the volume delivered, is controlled by a proper setting of timer 18.

The timing mechanism, hereinafter described in greater detail, is connected to a push-button selector switch 19 having seven positions, one for each storage tank from which liquid is to be drawn. Selection is made by pressing the desired button.

Each selection simultaneously operates a gang of three switches. Thus, as shown in FIGURE 4, one of the switches in each gang is connected to a separate small neon panel light 20, a second is connected to a solenoid 12, and the third is connected to a level-indicating system which warns the operator during the replenishing step when the level of replenishing solution in the storage tank is low.

This warning system comprises a pair of elongated conductors 21 and 22 immersed in the solution in each one of the storage tanks. These conductors are connected through switch 19c to relay 23 which is also connected to the source of power.

A circuit, comprising a buzzer 24, a buzzer switch 25, an indicator light 26, and a resistor 31, is connected through relay 23 to the source of power as shown in FIGURE 4. In use, buzzer switch 25 is closed. As soon as liquid in the storage tank selected by switch 19 drops below a safe level, current from relay 23 to armature 32 is interrupted, causing the armature to swing into a position whereby the buzzer circuit is connected to the source of power. Both the low-level light 26 and buzzer 24 are activated, thus telling the operator that the particular storage tank he selected is running low. Opening switch 25 will turn off the buzzer, but, as shown, low-level light 26 will remain on.

As can be seen from FIGURE 4, power to operate the neon lights and the solenoids is obtained through switches 19a and 19b, respectively, which are each connected in parallel through a common resistor 36 in conductor 37 to the timing mechanism.

In operation of the system, the apparatus is plugged into a source of power thus energizing lines $L_1$ and $L_2$. Power switch 14 is closed, turning on indicator light 15 to show that the apparatus is ready for use.

When it is necessary to replenish solution from one of the storage tanks the button on selector switch 19 corresponding to the desired tank is pressed, and the dial on the timer set for the desired duration of flow. The timing mechanism is a commercially available instrument which comprises a timing motor 30 connected to the timer 18. When the timer has been set for the desired duration of liquid flow, replenishing switch 17 is momentarily closed, thereby energizing clutch coil 38. This causes switch 39 to close with contact 40 and switch 41 to close with contact 42 thus simultaneously sending current to timing motor 30, when auxiliary contacts 43 and 44 are in the positions shown in FIGURE 4, and to selector switch 19 through line 37. Since pressing a button on the selector switch operates three ganged switches 19a, 19b and 19c, the neon panel light lights up and shows which circuit was selected, a solenoid 12 is simultaneously activated and opens a valve 11 which permits liquid to flow under the gas pressure, and the low level warning system is activated. As soon as the timing motor 30 in timer 18 stops, switches 39 and 41 are tripped open and power to the selector switch is cut off. The neon light then goes off, solenoid 12 closes valve 11, and low level warning system is turned off.

It will be obvious that as many storage tanks as are desired for any given purpose may be provided, it merely being necessary to have a selector switch with enough different positions. Each different storage tank is connected to its own position on the selector switch.

The timer, selector switch, neon lights power switch, buzzer switch, pressure control valve, and pressure gauge may all be mounted as a self-contained unit on rack 33 and control panel 34 near the operator while the storage tanks may be mounted on a rack (not shown) at some remote point. The tanks and control panel can be connected by a suitable electric cable and by chemically inert tubes (not shown), the electrical connections to the panel being made through receptacle 35, and the liquid connections, as previously explained to the fittings 11a and 11b on solenoid-operated valves 11.

While seven storage tanks and the required electrical connections therefor are shown in the drawings, it will be appreciated that the number of storage tanks, etc. will vary depending on the process employed.

It is to be understood that the foregoing detailed description is given merely by way of illustration and that many variations may be made therein without departing from the spirit of this invention.

What is desired to be secured by Letters Patent is:

1. For use in the film processing industry, a system for selectively transferring liquid to one of a plurality of different utilization points which comprises a plurality of liquid-storage means corresponding to said utilization points; separate liquid-conducting means connecting each of said storage means to a corresponding utilization point; flow-control means associated in operative relationship with each of said liquid-conducting means; liquid-level indicating means comprising liquid-level sensing means in each of said liquid-storage means and a single signal producing means; and manually operated means for selectively and separately activating each of said flow-control means and for simultaneously connecting said signal producing means to the said liquid-level sensing means in the storage means selected.

2. For use in the film processing industry, a system for selectively transferring liquid to one of a plurality of different utilization points which comprises a plurality of liquid-storage means corresponding to said utilization points; separate liquid-conducting means connecting each of said storage means to a corresponding utilization point; means for causing liquid to flow from said storage means to said utilization points; a solenoid-operated flow-control valve connected to each of said liquid-conducting means; means for indicating low liquid-level comprising liquid-level sensing means in each of said storage means and a single signal producing means; a source of electric power for activating said solenoid-operated flow-control valves; and manually operated means for selectively and separately connecting said source of electric power with a solenoid-operated flow-control valve and for simultaneously connecting said signal producing means to the said liquid-level sensing means in the corresponding storage tank.

3. For use in the film processing industry, a system for selectively transferring liquid to one of a plurality of different utilization points which comprises a plurality of liquid-storage means corresponding to said utilization points; separate liquid-conducting means connecting each of said storage means to a corresponding utilization point; means for causing liquid to flow from said storage means to said utilization points; a solenoid-operated flow-control valve connected to each of said liquid-conducting means; means for indicating low liquid level comprising liquid-level sensing means in each of said storage means and a single signal producing means; a source of electric power for activating said solenoid-operated flow-control valves; time-controlled switch means connected to said source of electric power; and manually operated means for selectively and separately simultaneously connecting said time-controlled switch means with a solenoid-operated flow-control valve and with indicating means to indicate the flow-control valve selected, and simultaneously to connect said signal producing means to the said liquid-level sensing means in the corresponding storage tank.

4. Apparatus for use in the film processing industry for selectively transferring liquid from a plurality of storage means to a plurality of corresponding utilization points which comprises separate liquid-conducting means for conducting liquid from each of a plurality of storage means; means for causing liquid to flow through said liquid-conducting means; a solenoid-operated flow-control valve connected to each of said liquid-conducting means; means for indicating low liquid level comprising liquid-level sensing means in each of said storage means and a single signal producing means; and manually operated means for selectively and separately connecting a source of electric power with a solenoid-operated flow-control valve and for simultaneously connecting and signal producing means to the said liquid-level sensing means in the storage means from which liquid is to be withdrawn.

5. Apparatus for use in the film processing industry for selectively transferring liquid from a plurality of storage means to a plurality of corresponding utilization points which comprises separate liquid-conducting means for conducting liquid from each of a plurality of storage means; means for causing liquid to flow through said liquid-conducting means; a solenoid-operated flow-control valve connected to each of said liquid-conducting means; means for indicating low liquid level comprising liquid-level sensing means in each of said storage means and a single signal producing means; time-controlled switch means for connecting a source of electric power with said solenoid-operated flow-control valves; and manually operated means for selectively and separately simultaneously connecting said time-controlled switch means with a solenoid-operated flow-control valve and with indicating means to indicate the flow-control valve selected, and simultaneously to connect said signal producing means to the said liquid-level sensing means in the storage means from which liquid is to be withdrawn.

References Cited in the file of this patent

UNITED STATES PATENTS

| | | |
|---|---|---|
| 2,565,804 | Parks | Aug. 21, 1951 |
| 2,566,873 | Britton | Sept. 4, 1951 |
| 2,843,144 | Robinson | July 15, 1958 |
| 2,859,760 | Borell | Nov. 11, 1958 |
| 2,920,642 | Tiefenthaler | Jan. 12, 1960 |

FOREIGN PATENTS

| | | |
|---|---|---|
| 516,241 | Great Britain | Dec. 28, 1939 |
| 1,154,581 | France | Nov. 4, 1957 |